United States Patent [19]

Vasta

[11] 3,969,569

[45] July 13, 1976

[54] COATING COMPOSITION OF A STYRENE/ALLYL ALCOHOL POLYMER AND A POLYISOCYANATE

[75] Inventor: Joseph A. Vasta, Woodbury, N.J.

[73] Assignee: E. I. Du Pont de Nemours and Company, Wilmington, Del.

[22] Filed: Oct. 30, 1974

[21] Appl. No.: 519,354

[52] U.S. Cl. ............................ 428/332; 260/42.29; 260/77.5 CR; 260/859 R; 428/423; 428/461
[51] Int. Cl.² .................... C08L 75/08; B32B 15/08
[58] Field of Search ................ 260/859 R, 77.5 CR; 428/332, 423

[56] References Cited
UNITED STATES PATENTS

| | | | |
|---|---|---|---|
| 2,965,615 | 12/1960 | Tess | 260/77.5 CR |
| 3,028,367 | 4/1962 | O'Brien | 260/859 R |
| 3,267,058 | 8/1966 | Hixenbaugh | 260/77.5 CR |
| 3,297,745 | 1/1967 | Fekete | 260/471 |
| 3,719,638 | 3/1973 | Huemmer | 260/77.5 CR |

*Primary Examiner*—Murray Tillman
*Assistant Examiner*—W. C. Danison, Jr.

[57] ABSTRACT

A coating composition in which the film-forming constituents are a styrene/allyl alcohol polymer and an organic polyisocyanate; the coating composition is particularly useful as a finish for appliances, such as refrigerators, stoves, washers, dryers and the like and is useful in coil coating sheets of steel and aluminum.

12 Claims, No Drawings

COATING COMPOSITION OF A STYRENE/ALLYL ALCOHOL POLYMER AND A POLYISOCYANATE

BACKGROUND OF THE INVENTION

1. Field Of The Invention

This invention relates to a thermosetting coating composition and in particular to a thermosetting coating composition of a hydroxyl containing polymer and a polyisocyanate.

2. Description Of the Prior Art

Thermosetting coating compositions are well known in the art, in particular, thermosetting compositions utilizing polyesters are known, as shown in Sekmakas U.S. Pat. No. 3,457,324, issued July 22, 1969. Also, thermosetting coating compositions of a hydroxyl containing polyester and a blocked polyisocyanate are known as shown in Steinmetz U.S. Pat. No. 3,808,160, issued Apr. 30, 1974. Coating compositions disclosed in these patents form good quality finishes. However, industry requires coatings of improved quality for finishes for appliances such as stoves, refrigerators, washers, dryers and the like, that are highly durable, flexible, scratch resistant, mar resistant, stain resistant and detergent resistant. Also, the industry is in need of a coating composition for coils or sheets of metal that can be applied by conventional coil coating techniques which will provide finishes with improved flexibility and that will withstand post-forming operations that are used to make the aforementioned appliances.

SUMMARY OF THE INVENTION

The coating composition of this invention comprises 10–90% by weight of film-forming constituents in an organic liquid; the film-forming constituents are a blend of 1. about 10–90% by weight, based on the weight of the film-forming constituents, of a polymer of styrene-/allyl alcohol that has a hydroxyl content of about 3–9% by weight and a specific viscosity of about 0.4–0.8 measured at 25°C. using 10 grams of copolymer in 100 milliliters of methylethyl ketone; and 2. about 90–10% by weight, based on the weight of the film-forming constituents, of an organic polyisocyanate.

DESCRIPTION OF THE INVENTION

The novel coating composition of this invention is a blend of a styrene/allyl alcohol polymer and an organic polyisocyanate in an organic liquid carrier. The composition is applied to a substrate by conventional techniques and then is cured to a cross-link composition which is tough, flexible, durable, scratch and stain resistant finish. The combination of the styrene/allyl alcohol polymer and an organic polyisocyanate provides a coating composition that forms a finish that has physical properties such as detergent resistance and flexibility which are superior to the compositions of the prior art.

The coating composition has a solids content of film-forming constituents of about 10–90% by weight. Preferably, the composition has a solids content of film-forming constituents of about 40–70% by weight since this provides a coating composition with good application properties but also has a lower content of organic liquid which substantially reduces air pollution when the composition is applied and cured.

About 10–90% by weight, based on the weight of the film-forming constituents utilized in the composition, of the styrene/allyl alcohol polymer is used. Preferably, to form a high quality coating composition, about 30–70% by weight of the polymer is used. To form a composition particularly useful for coil coating, about 30–40% by weight of the polymer is used. The polymer has a hydroxyl content of about 3–9% by weight and a specific viscosity of about 0.4–0.8 which is measured at 25°C. using 10 grams of a copolymer in 100 milliters of methyl ethyl ketone.

One particularly useful polymer which forms high quality finishes contains about 90–70% by weight styrene and 10–30% by weight allyl alcohol. This preferred copolymer has a hydroxyl content of about 5–8% by weight and a specific viscosity of about 0.5–0.7 measured as indicated above.

The styrene/allyl alcohol polymers are known in the art and are prepared by conventional polymerization techniques. The polymer can be prepared by charging the monomers into a conventional polymerization vessel with a polymerization catalyst and optionally, a solvent for the monomers and the mixture is heated at about 100°–200°C. for about 2–24 hours to form the polymer.

The coating composition contains about 10–90% by weight, based on the weight of the film-forming constituents utilized in the composition, of an organic polyisocyanate. Preferably, about 30–70% by weight of the organic polyisocyanate is utilized to form a high quality composition. To form a coil coating composition about 60–70% by weight of the organic polyisocyanate is used. Blocked polyisocyanates also can be used in the coating composition in the percentages indicated above. Blocked polyisocyanates useful in the composition will be discussed hereinafter in greater detail.

To form a coating composition which will readily cure to a highly cross-linked finish, the number ratio of the hydroxyl groups of the styrene/allyl alcohol polymer and the isocyanate groups of the organic polyisocyanate should be about 0.5:1 to about 5:1. This ratio also applies to blocked isocyanate groups.

A wide variety of aliphatic polyisocyanates aromatic polyisocyanates, alicyclic polyisocyanates can be used in this invention. The following is a list of useful polyisocyanates:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;

methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-cycylhexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cylcohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
2,6-diisocyano-pyridine,
bis-(4-isocyano-phenyl)diethyl silane,
bis-(4-isocyano-phenyl)diphenyl silane,
dichloro-diphenylene diisocyanate,
bis-(4-isocyano-phenyl)ethyl phosphone oxide,
bis-(4-isocyano-phenyl)phenyl phosphine oxide,
bis-(4-isocyano-phenyl)N-phenyl amine,
bis-(4-isocyano-phenyl)N-methyl amine,
3,3'-dimethyl-4,4'-diisocyano biphenyl,
3,3'-dimethoxy-dipihenylene diisocyanate,
2,4-bis-($\beta$-isocyano-t-butyl) toluene,
bis-(para-$\beta$-isocyano-t-butyl-phenyl)ether,
para-bis-(2-methyl- 4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propxy)ethane,
2,2'dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cylcohexane,
1,2-diisocyano-octadecane,
2,5-diisocyano-1,3,4-oxadiazole.
OCN(CH$_2$)$_3$ O(CH$_2$)$_2$ O(CH$_2$)$_3$ NCO,
OCN(CH$_2$)$_3$ S(CH$_2$)$_3$ NCO,
OCN(CH$_2$)$_3$ N(CH$_2$)$_3$ NCO,
polymethylene polyphenyl isocyanate, and

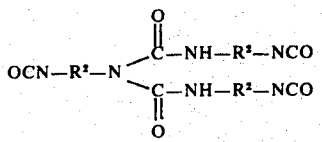

where R$^2$ is an alkylene group having 1–6 carbon atoms,
where in preferred type is the biuret of hexamethylene diisocyanate.

It should be pointed out if discoloration of the coating causes a problem due to exposure to actinic light, polyisocyanates containing aromatic radicals should not be utilized in the composition, in those cases, it is preferable to use saturated aliphatic or an alicyclic polyisocyanate.

As mentioned above blocked polyisocyanates can be used in the coating composition of this invention. The obvious advantage of using blocked polyisocyanates is that the composition will remain stable for long periods of time and will not gel since the isocyanate groups are in combination with a blocking agent and therefore will not react until sufficient heat is applied to release the blocking agent.

Any of the aforementioned polyisocyanates reacted with another chemical compound to form a thermally unstable reaction product can be utilized. This reaction product (blocked organic polyisocyanate) must be stable below 50°C. for long periods of time and must be compatible with the styrene/allyl alcohol polymer used in the coating composition. However, this product must break down under moderate baking conditions, for example, 125°–200°C., to form a polyisocyanate with reactive isocyanate groups that will cross-link the styrene/allyl alcohol polymer in the novel composition.

Typical blocking agents that can be used to form the blocked organic polyisocyanate used in the coating composition are, for example, phenol compounds, alcohols, such as tertiary butyl alcohol, ketoximes, hindered glycol esters, and the like. Typical phenol compounds that can be used are phenol, propyl phenol, tertiary butyl phenol, nonyl phenol, other monohydric phenols, bromo phenol, 2-chloro phenol, dichloro phenol, lithoxy phenol, 2-methoxy nitrophenol and the like. Preferably, ketoximes are used as blocking agents for the blocked polyisocyanate used in this invention. Some preferred ketoximes are, for example, acetoxime, methylethyl ketoxime, diisobutyl ketoxime and the like.

One preferred group of blocked organic polyisocyanate which form high quality coating compositions are prepared by reacting the polyol with an alkylene oxide and this product is reacted with one of the aforementioned polyisocyanates to form an adduct. This adduct is then reacted with one of the aforementioned blocking agents. Typical polyols that are used to prepare these preferred blocked organic polyisocyanates are glycerin, trimethylopropane, trimethylolethane, pentaerythritol, and hexane triol and the like. Typical alkylene oxides used to prepare these preferred blocked organic polyisocyanates are ethylene oxide, propylene oxide, butylene oxide, butyl glycidyl ether, "Cardura E" glycidyl ester and the like.

One resin of this type is the reaction product of trimethylol propane and propylene oxide which is subsequently reacted with 4,4'-methylene-bis(cyclohexyl isocyanate) and this compound is blocked with methylethyl ketoxime. Another useful compound is the reaction product of pentaerythritol and propylene oxide which is reacted with 4,4'-methylene-bis(cyclohexyl isocyanate) and blocked with methylethyl ketoxime. Glycerine reacted with propylene oxide which is subsequently reacted with 4,4'-methylene-bis(cyclohexyl isocyanate) and blocked with methylethyl ketoxime is also very useful. The polyol from polycaprolactone having a number average molecular weight of about 540 is reacted with propylene oxide to form an adduct which is subsequently reacted with 4,4'-methylene-bis(cyclohexyl isocyanate) and is blocked with methylethyl ketoxime is also useful.

Suitable organic liquids used to prepare the coating composition of this invention are toluene, xylene, butyl acetate, ethylene glycol monoethyl ether acetate, ethylene glycol monobutyl ether acetate, hydrocarbon solvents having a boiling point of 150°–220°C., acetone, methylisobutyl ketone, methylethyl ketone, butanol, diacetone alcohol, methylene glycol monoethylene ether acetate, diethylene glycol monobutyl ether acetate, and other aliphatic, cycloaliphatic and aromatic hydrocarbons, esters, ethers and ketones which are non-reactive with the constituents of the coating compositions.

About 0.01–0.1% by weight, based on the weight of the film-forming constituents, used in the novel composition of this invention, of a catalyst can be added to the composition to accelerate the cross-linking of the styrene/allyl alcohol polymer and the blocked organic polyisocyanate as the coating composition is being cured. Typically useful catalysts are as follows: the organo tin catalysts such as butyl tin dilaurate, dibutyl tin di-2-ethylhexoate; stannous octoate, stannous oleate and the like; zinc naphthenate, cobalt naphthenate, vanadium acetyl acetonate, zirconium acetyl acetonate, acetyl acetonate titanate and the like; tertiary amines such as triethylene diamine, triethylamine and substituted morpholines.

The novel coating composition can be used as a clear, i.e., without pigment, but for most cases, the composition is pigmented and contains up to 50% by weight, based on the weight of the film-forming constituents, of the pigment. Generally, when the composition is pigmented, it contains about 0.5–50% by weight, based on the weight of the film-forming constituents, of pigment. Typical pigments that can be used are: metallic oxides, such as titanium dioxide, zinc oxide, iron oxide and the like, metal hydroxides, metal flakes, metal powders, chromates, such as lead chromate, sulfides, sulfates, carbonates, carbon black, silica, talc, china clay, iron blues, organic reds, maroons and organic dyes and lakes.

The pigments are introduced into the coating composition by first forming a mill base with the styrene/allyl alcohol polymer by conventional sand-grinding or ball-milling or pebble-milling techniques. The mill base is then blended with the film-forming constituents as shown in the following Examples.

The novel coating composition can be applied to a variety of substrates such as steel, aluminum, zinc, copper and other metals, glass, plastics, wood and the like by conventional techniques such as brushing, spraying, flow-coating, dip-coating, coil-coating and the like. After the coating is applied, it is baked from 1 to 90 minutes at about 150°–275°C. The novel composition is particularly adapted to be applied to coils of metal such as aluminum and steel by conventional coil coating techniques in which the composition is baked for about 30 to 90 seconds and about 75° to 225°C.

The finishes are applied to a suitable thickness which is about 0.1–10 mils thick but for most uses generally the finishes are about 1–3 mils thick. The finishes can be applied in a single step or in multiple steps.

The novel coating composition of this invention preferably is applied over suitably treated primed metal substrates such as a steel substrate treated with zinc phosphate or a metal substrate coated with typical alkyd primers or epoxy primers, which are pigmented with iron oxide, carbon black, titanium dioxide and the like. The novel composition can be used directly over galvanized steel or untreated aluminum.

The novel composition of this invention forms a finish which is hard, flexible, durable, mar, scratch and detergent resistant and makes the coating composition particularly suitable for appliances, truck bodies, auto bodies, airplane equipment, railroad equipment, vending machines, metal siding such as aluminum siding and the like. The novel composition is particularly useful in coil coating wherein the coated metal sheet material is to be subjected to post forming techniques; for example, coated aluminum for siding and coated sheets for parts of appliances. The extreme flexibility, durability, scuff and mar resistance of the finish make these particular end uses possible.

The following examples illustrate the invention. All quantities and percentages are on a weight basis unless otherwise indicated.

EXAMPLE 1

A styrene/allyl alcohol polymer solution is prepared by charging the following ingredients into a vessel equipped with a stirrer:

|  | Parts By Weight |
|---|---|
| Styrene/Allyl alcohol polymer (hydroxyl content 7.7% by weight and a specific viscosity measured as indicated above, 0.59 and a number average molecular weight of about 1150) | 300 |
| Xylene | 160 |
| N-butanol | 40 |
| Total | 500 |

The ingredients are heated with constant stirring until the copolymer dissolves and a clear solution is formed.

A blocked isocyanate resin solution is prepared by charging the following ingredients into a stainless steel reactor equipped with a stirrer and equipped with a heating mantle:

| Portion 1 | Parts By Weight |
|---|---|
| Methylene-bis-(cyclohexyl isocyanate) (20% trans isomer) | 220.60 |
| Dibutyl tin dilaurate (20% tin) | 0.06 |
| Hydrocarbon solvent (boiling point 182–219°C. | 4.80 |
| Portion 2 | Parts By Weight |
| Propylene oxide adduct trimethlolpropane (hydroxyl number about 385–410 measured according to ASTME-326-69 and having a specific gravity of 1.029 measured at 25°C. | 118.76 |
| Hydrocarbon solvent (described above) | 213.66 |
| Dibutyl tin dilaurate (20% tin) | 0.03 |
| Portion 3 | |
| Methyl ethyl ketoxine | 76.72 |
| Portion 4 | |

-continued

| | |
|---|---|
| Hydrocarbon solvent (described above) | 93.32 |
| Diethylene glycol monobutyl ether acetate | 58.24 |
| Methylene glycol monoethyl ether acetate | 45.81 |
| Total | 832.00 |

Portion 1 is charged into a stainless steel reaction vessel in the order indicated above with constant agitation and blanketed with nitrogen. Portion 2 is premixed and then added at an even rate over an 80 minute period to the reaction vessel while the reaction vessel is under constant agitation. The temperature of the resulting reaction mixture increases 15°–20°C. during the addition and upon completion of the addition, the reaction mixture is maintained at 50°–60°C. for an additional 2 hours and then held for an additional 2 hours while the reaction mixture is cooled to 40°C. Portion 3 is then added at a uniform rate over an 80 minute period while maintaining the reaction mixture at 50°–60°C. during the addition and then the reaction mixture is held for 1 hour at 50°–60°C. Portion 4 is then added with constant agitation and the reaction mixture is cooled to 45°C. and filtered to remove any coagulants.

The resulting solution has a weight solids content of about 50% and has a Gardner Holdt viscosity of about U-W measured at 25°C.

A coating composition is prepared as follows:

| | Parts By Weight |
|---|---|
| Styrene/Allyl alcohol polymer solution (prepared above) | 34.0 |
| Blocked isocyanate resin solution (prepared above) | 66.0 |
| Cobalt naphthenate solution (6% cobalt) | 0.1 |
| Total | 100.1 |

The above ingredients are thoroughly mixed together to form a coating composition.

The above coating composition is drawn down with a No. 40 wire wound rod on an aluminum panel and baked at 225°C. for 40 seconds to form a finish that has excellent adhesion to the substrate, good scratch and mar resistance and good flexibility. The finish has pencil hardness of 3H-5H and does not crack when bent over two thicknesses of metal.

EXAMPLE 2

A styrene/allyl alcohol polymer solution is prepared as follows:

| | Parts by Weight |
|---|---|
| Styrene/allyl alcohol polymer (described in Example 1) | 2100 |
| Hydrocarbon solvent (boiling point 150–190°C., aniline point −28°C.) | 1120 |
| N-butanol | 280 |
| Total | 3500 |

The above ingredients are charged into a vessel equipped with a stirrer and heated for about an hour and a half with constant agitation until a clear solution is formed.

A white mill base is prepared as follows;

| | Parts By Weight |
|---|---|
| Styrene/allyl alcohol polymer solution (prepared above) | 600 |
| Hydrocarbon solvent (boiling point 182–219°C.) | 480 |
| Diacetone alcohol | 120 |
| Titanium dioxide pigment | 1800 |
| Total | 3000 |

The above ingredients are charged into a pebble mill and ground for about 64 hours to form a mill base having the pigment uniformly dispersed therein.

A coating composition is prepared as follows:

| | Parts By Weight |
|---|---|
| White mill base (prepared above) | 486 |
| Styrene/allyl alcohol polymer solution (prepared above) | 83 |
| Blocked Isocyanate resin solution (prepared in Example 1) | 400 |
| Hydrocarbon solvent (boiling point 182–219°C.) | 25 |
| Isophorone | 6 |
| Total | 1000 |

The above ingredients are thoroughly mixed together to form a coating composition which has a viscosity of about 57 seconds in a No. 3 Zahn cup. The coating composition is drawn down with a No. 40 wire wound rod on an aluminum panel and baked at 225°C. for 45 seconds to form a finish that is about 1 mil thick. The finish has good adhesion to the substrate, good mar and scratch resistance and good hardness.

The coating composition is reduced to a spray viscosity of 30 seconds using a No. 2 Zahn cup with xylene. The resulting composition is sprayed onto a phosphatized steel panel and baked at 325°C. for 30 minutes to form a finish that is about 1.3–1.5 mils thick. The finish has good adhesion to the steel substrate, good mar and scratch resistance and excellent hardness.

EXAMPLE 3

A styrene/allyl alcohol polymer solution is prepared as follows:

| | Parts By Weight |
|---|---|
| Styrene/Allyl alcohol polymer solution (hydroxyl content 5.7% by weight, a specific viscosity of 0.65 and a number average molecular weight of 1600) | 2100 |
| Hydrocarbon solvent (boiling point 150–190°C., Aniline No. −28°C.) | 3220 |
| N-Butanol | 3500 |
| Total | 8820 |

The above ingredients are charged into a vessel equipped with a stirrer and a heating mantel. The ingredients are heated to a reflux temperature and are under constant agitation until a clear solution is formed. The solution is cooled to room temperature and has a Gardner Holdt viscosity of about Z.

A white mill base is prepared as follows:

| | Parts By Weight |
|---|---|
| Styrene/Allyl alcohol polymer solution (prepared above) | 600 |
| Hydrocarbon solvent (described above) | 480 |
| N-Butanol | 120 |

-continued

|  | Parts By Weight |
|---|---|
| Titanium dioxide pigment | 1800 |
| Total | 3000 |

The above ingredients are charged into a pebble mill and ground for 72 hours to form a mill base having the pigment uniformly disposed therein.

A coating composition is prepared as follows:

|  | Parts By Weight |
|---|---|
| Blocked isocyanate resin solution (prepared in Example 1) | 435.95 |
| Styrene/allyl alcohol polymer solution (prepared above) | 60.95 |
| White mill base (prepared above) | 477.22 |
| Isophorone | 11.36 |
| Hydrocarbon solvent (described above) | 17.56 |
| Mixed methyl esters of $C_4$–$C_6$ aliphatic dicarboxylic acids | 28.93 |
| Cobalt naphthenate solution (6% cobalt) | 1.00 |
| Total | 1032.97 |

The above ingredients are charged into a mixing vessel in the order shown and mixed for 1 hour and are held for 2 hours to remove air bubbles and then filtered. The resulting coating composition has a No. 3 Zahn cup viscosity of 19 seconds.

Phosphatized steel panels are coated as follows with the above prepared coating composition:

A No. 40 wire wound rod is used to apply the coating, the coating is allowed to dry at ambient temperatures for 3 minutes and then is baked at 260°C. for 35 seconds. The resulting finish is about 0.95–1.0 mils in thickness and has a pencil hardness of 4H and has good detergent resistance, impact resistance, good flexibility, and resistance to stains of mustard, dye and lipstick.

The composition was reduced to a spray viscosity of 30 seconds determined with a No. 2 Zahn cup with xylene solvent and sprayed onto a steel panel and baked at 325°C. for 30 minutes. The resulting finish was about 1.5 mils thick and has good adhesion to the steel substrate, good hardness, detergent resistance, impact resistance, excellent flexibility and stain resistance.

The invention claimed is:

1. A coating composition comprising 10–90% by weight of film-forming constituents consist essentially of
   1. about 10–90% by weight, based on the weight of the film-forming constituents, of a styrene/allyl alcohol polymer of 90–70% by weight styrene and 10–30% by weight allyl alcohol having a hydroxyl content of about 3–9% by weight and a specific viscosity of about 0.4–0.8 measured at 25°C. using 10 grams of copolymer in 100 milliliters of methylethyl ketone; and
   2. about 90–10% by weight, based on the weight of the film-forming constituents, of a blocked organic polyisocyanate adduct in which the blocked organic polyisocyanate adduct is the reaction product of a polyether resin or a polyester resin and an aliphatic or cycloaliphatic organic diisocyanate and having the isocyanate groups blocked with an alkyl ketoxime.

2. The coating composition of claim 1 containing up to 50% by weight, based on the weight of the film-forming constituents, of pigment.

3. The coating composition of claim 2 wherein the number ratio of hydroxyl groups of the styrene/allyl alcohol polymer to isocyanate groups of the organic polyisocyanate is about 0.5:1 to about 5:1.

4. The coating composition of claim 2 in which the blocked organic polyisocyanate is the reaction product of an alkylene oxide and polyol and an aliphatic diisocyanate or an alicyclic diisocyanate and having the isocyanate groups blocked with an alkyl ketoxime.

5. The coating composition of claim 4 in which the alkylene oxide is propylene oxide and the polyol is glycerine and the diisocyanate is methylene-bis(cyclohexyl isocyanate) and the blocking agent is methyl ethyl ketoxime.

6. The coating composition of claim 4 in which the alkylene oxide is propylene oxide and the polyol is trimethylol propane and the diisocyanate is methylene bis-(cyclohexyl isocyanate) and the blocking agent is methyl ethyl ketoxime.

7. The coating composition of claim 1 containing 0.01–0.10%, based on the weight of the film-forming constituents, of an organic metal dryer.

8. The coating composition of claim 1 wherein the film-forming constituents consist essentially of
   1. about 30–70% by weight, based on the weight of the film-forming constituents, of the styrene/allyl alcohol polymer containing 90–70% by weight styrene and 10–30% by weight allyl alcohol and having a hydroxyl content of 5–8% by weight and a specific viscosity of 0.5–0.7; and
   2. about 70–30% by weight, based on the weight of the film-forming constituents, of a blocked organic polyisocyanate which is the reaction product of a propylene oxide and trimethylol propone and methylene-bis-(cyclohexyl isocyanate) in which the residual isocyanates are blocked with methylethyl ketoxime.

9. The coating composition of claim 8 containing 0.01–0.1% by weight, based on the weight of the film-forming constituents, of a cobalt naphthenate dryer.

10. The coating composition of claim 8 containing 0.5–50% by weight, based on the weight of the film-forming constituents, of pigment.

11. An article coated with about 0.1–10 mil thick dried coalesced coating of the composition of Claim 1.

12. The coated article of claim 11 in which the article is a metal substrate of a ferrous metal or aluminum.

* * * * *